United States Patent
Mathai et al.

(10) Patent No.: US 8,300,996 B2
(45) Date of Patent: Oct. 30, 2012

(54) OPTICAL BUS FOR OPTICAL SIGNAL BROADCASTING

(75) Inventors: Sagi Varghese Mathai, Palo Alto, CA (US); David A. Fattal, Mountain View, CA (US); Paul Kessler Rosenberg, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 326 days.

(21) Appl. No.: 12/847,854

(22) Filed: Jul. 30, 2010

(65) Prior Publication Data

US 2012/0027339 A1   Feb. 2, 2012

(51) Int. Cl.
  *G02B 6/12* (2006.01)
  *G02B 6/28* (2006.01)
(52) U.S. Cl. .................. 385/24; 385/14; 385/48
(58) Field of Classification Search ............. 385/48
See application file for complete search history.

(56) References Cited

U.S. PATENT DOCUMENTS

| | | | |
|---|---|---|---|
| 5,541,914 A | 7/1996 | Krishnamoorthy et al. | |
| 5,604,828 A | 2/1997 | Yaffe | |
| 6,587,605 B2 | 7/2003 | Paniccia et al. | |
| 7,088,891 B2 | 8/2006 | Jung et al. | |
| 7,251,385 B2 | 7/2007 | Kondo | |
| 7,570,844 B2 | 8/2009 | Handelman | |
| 2009/0041462 A1* | 2/2009 | Costa et al. | 398/79 |

FOREIGN PATENT DOCUMENTS

WO   WO2009055016   4/2009

* cited by examiner

*Primary Examiner* — Jerry Rahll

(57) ABSTRACT

An optical bus is described for optical signal broadcasting. The optical bus can include a substrate and input optical waveguides formed on the substrate. First and second sets of output optical waveguides can also be formed on the substrate. Optical power splitters on the substrate can have an input and multiple outputs. The optical power splitters can be optically coupled to an input optical waveguide and can split an input optical beam into multiple output optical beams. The optical bus can include a waveguide shuffle network formed on the substrate. The waveguide shuffle network can include intersecting optical waveguides and can optically couple outputs from each of the optical power splitters to the first set of output optical waveguides and optically couple different outputs from each of the optical power splitters to the second set of output optical waveguides.

20 Claims, 6 Drawing Sheets

OPTICAL BUS FOR OPTICAL SIGNAL BROADCASTING

BACKGROUND

Recent electronic devices have incorporated optical components in place of electrical components. Increases in communication capacity within chips, boards, modules, and subsystems of chips are limited by electrical interconnects that are used in the chips, boards, modules, and subsystems of chips. Optical interconnects are often considered as enabling better performance than electrical interconnects, for example in terms of bandwidth, distance, and susceptibility to electromagnetic noise.

Alignment can be a difficulty with optical interconnects, photonic circuit modules, waveguides, and/or optical components. Without proper alignment, many optical systems cannot function properly. Precise alignment can be difficult and time consuming. Manufacturing complexity, time-expenditure, and cost of optical devices can be high as a result of small tolerances.

DETAILED DESCRIPTION

Reference will now be made to the exemplary embodiments illustrated, and specific language will be used herein to describe the same. It will nevertheless be understood that no limitation of the scope of the technology is thereby intended. Additional features and advantages of the technology will be apparent from the detailed description which follows, taken in conjunction with the accompanying drawings, which together illustrate, by way of example, features of the technology.

Figure 1A:
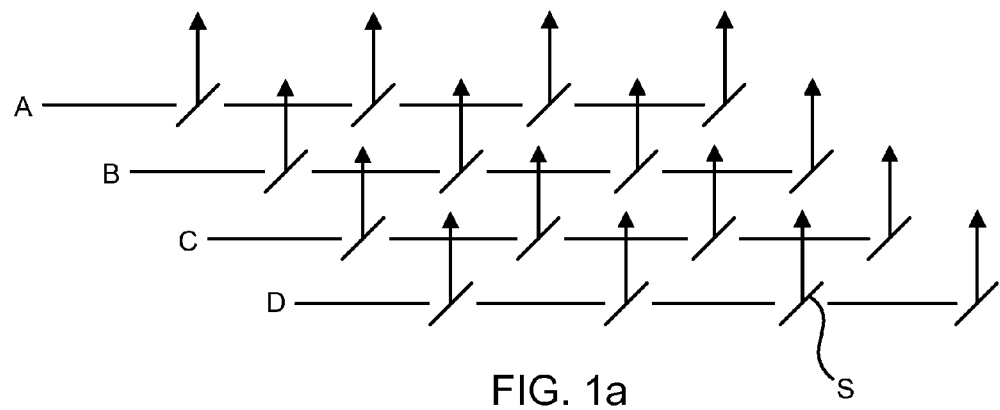
FIGS. 1a-1b are schematic views of a known optical broadcast system.

Referring to FIG. 1a, a known art system is shown for broadcasting optical signals. The system includes hollow metal waveguides A-D, which are parallel to one another. The waveguides have beam splitters S inserted along the waveguide to split an input optical beam. The beam can be split by wavelength, intensity, polarization, and so forth. The beam can be split any desired number of times. The system of FIG. 1a includes four inputs and 16 outputs, or alternatively a signal input including 4 different signals and 4 outputs each including a portion of the 4 signals from the single input.

Figure 1B:
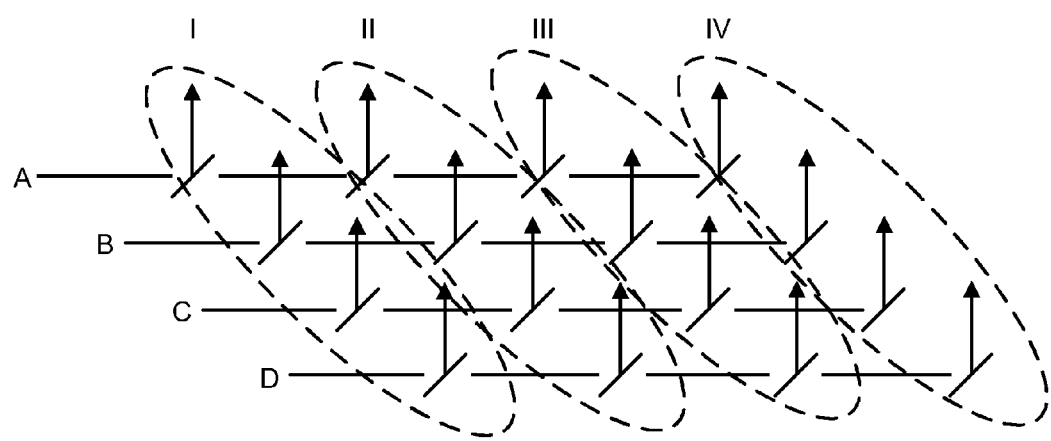

Referring to FIG. 1b, the system of FIG. 1a is shown with sets of outputs marked as I-IV. To broadcast an optical signal from a single source the signal is split a desired number of times and a portion of the original signal is sent to multiple recipient devices. In the example shown in FIG. 1b, four input signals are split four times and four sets of outputs each receive a portion of each of the input signals.

Optical broadcasting systems such as those shown in FIGS. 1a-1b involve an assembly process to insert beamsplitters into gaps along the waveguide array. Multiple sets of beam splitters with different reflectivities are used to achieve an equal power distribution. The system is a lossy system which loses a portion of the optical signals due to beam divergence in the gaps where the beam splitters are inserted. The system involves assembly and organization of discrete beam splitters and waveguides. The system further involves precise alignment of the beam splitters and waveguides.

To address at least some of the drawbacks of prior systems, an optical bus is described for optical signal broadcasting. The optical bus can include a substrate and input optical waveguides formed on the substrate. First and second sets of output optical waveguides can also be formed on the substrate. Optical power splitters on the substrate can have an input and multiple outputs. The optical power splitters can be optically coupled to an input optical waveguide and can split an input optical beam into multiple output optical beams. The optical bus can include a waveguide shuffle network formed on the substrate. The waveguide shuffle network can include intersecting optical waveguides and can optically couple outputs from each of the optical power splitters to the first set of output optical waveguides and optically couple different outputs from each of the optical power splitters to the second set of output optical waveguides.

Figure 2:
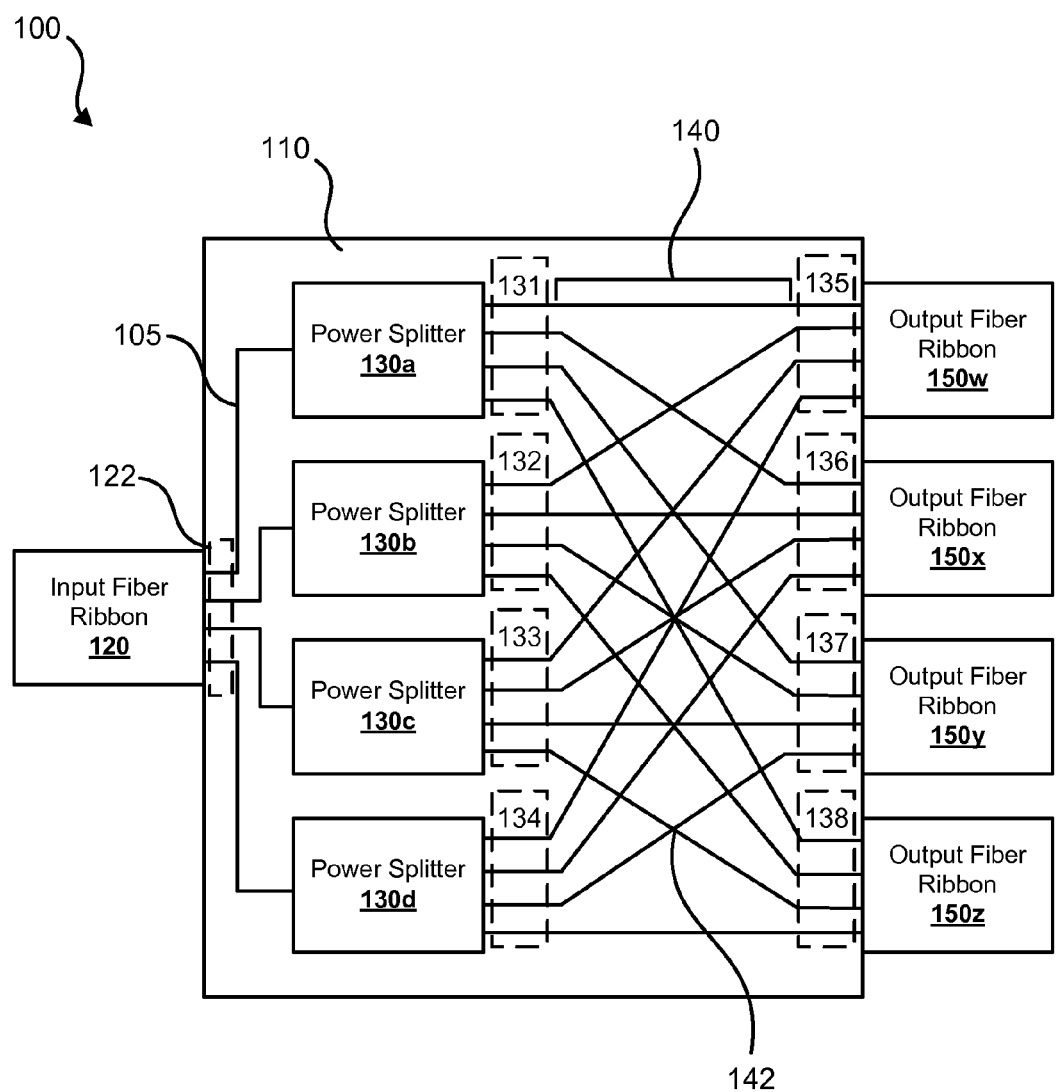
FIG. 2 is a block diagram of an optical bus for optical signal broadcasting in accordance with an embodiment.

Referring to FIG. 2, an optical bus 100 for broadcasting optical signals is shown in accordance with an embodiment. The optical bus includes a substrate 110. As described above, the substrate may comprise glass or silicon. In other examples, the substrate can be formed of other materials, such as quartz, plastic, etc. Fabrication of the optical bus will be described in additional detail below.

Optical waveguides 105 can be formed in or on the substrate. The optical waveguides may comprise solid-core waveguides. In one example, the waveguide comprises a silicon-on-insulator (SOI) waveguide. The optical waveguides can be formed using a variety of techniques as are known in the art. For example, a waveguide layer can be patterned using a semiconductor processing technique such as reactive ion etching (RIE), photolithography, or electron beam lithography thereby forming a ridge waveguide. The waveguide may be formed by partially irradiating the waveguide layer with patterned UV light or electron beams to change the refractive index of the irradiated areas. In the ridge waveguide example, the structure of the waveguide can include, for example, inversed ridge, or twin ridge waveguide (waveguide having projections on both sides in the thickness direction). In some examples waveguides can be formed as raised waveguides raised above a surface of the substrate. In other examples waveguides can be formed within the substrate.

The substrate can be configured to receive input from an input fiber ribbon 120. The input fiber ribbon may comprise any suitable fiber optic ribbon as is known in the art. For example, the fiber ribbon can include a plurality of optical fibers. The optical fibers can include one or more coats of a polyacrylate resin. In one example, the fibers can be aligned relative to one another in a planar relationship. The fibers can be circumscribed by a plastic or other material applied to fix the optical fibers in their aligned planar relationship to one another to form a ribbon like composite. The substrate may include alignment features, such as v-grooves, trenches, hard stops, etc., to precisely align the fiber array to the input waveguide array. In another example, the substrate can be configured to receive input from an input fiber ribbon where the optical fibers are fixed in a non-planar relationship.

FIG. 2 shows an input fiber ribbon 120 including four input optical fibers connecting to four input optical waveguides 122. A number of optical fibers in the input fiber ribbon and a number of corresponding input optical waveguides can vary in different applications and can include fewer or greater numbers of optical fibers or input optical waveguides. The input fiber ribbon of FIG. 2 includes fibers aligned relative to one another in a planar relationship. The input optical waveguides can likewise be aligned and arranged relative to one another in a corresponding planar relationship. For example, the input optical waveguides can be parallel, at least where the input fiber ribbon interfaces with the substrate 110.

The optical bus 100 can include optical power splitters 130a-d. An "optical power splitter", or simply "power splitter", as referred to herein is a passive device that splits the optical power carried by a single input optical beam into multiple output optical beams. (As used herein, the terms "light", "light beam", and "optical beam" are to be broadly interpreted to include any applicable spectral range including but not limited to visible, ultraviolet, and infra-red radiation). In general, optical power splitters are used for channeling input light into several different paths and are widely used in an optical communication systems, optical access networks, etc. Optical power splitters can be classified into 1×2, 1×4, 1×8, . . . 1×N (where N is a natural number), and N×M (where N and M are natural numbers) types according to a number of input and output terminals.

In one example, the input optical power can be split evenly between multiple outputs. For example, the input optical power can be split evenly between two, three, four, or more outputs. However, an optical power splitter may also distribute the optical power carried by an input optical beam in an uneven manner. For example, an optical power splitter may split most of the power from the input to one of the outputs and couple only a small amount of the power into one or more of the other outputs. This can compensate for unequal losses that the output optical beams may experience as the output optical beams travel through the shuffle network 140.

The power splitters 130a-d used in the optical bus 100 may be monolithically integrated with the substrate 110. In other words, the power splitters can be integrated in the substrate during the manufacturing process to eliminate a need for post-manufacture assembly. In one example, the power splitters can be formed as a part of the substrate. For example, the power splitters can be formed simultaneously with the waveguides using any of the fabrication techniques described herein. Also, in some embodiments the substrate may comprise a silicon-on-insulator and a device layer, including the power splitters, can be etched on the substrate to form the waveguides and the power splitters.

The substrate can include a same number of power splitters as a number of input optical waveguides 122. As illustrated in FIG. 2, four power splitters 130a-d can be used with four input waveguides. The input fiber ribbon may comprise a 1×4 fiber ribbon, or in other words a single fiber ribbon comprising four optical fibers. Each of the power splitters in this example may comprise a 1×4 power splitter. In other words, each of the power splitters may comprise a single input and four outputs. The outputs of each of the power splitters in FIG. 2 can be identified as a set of outputs. For example, the four outputs from power splitter 130a may comprise set 131, the outputs from 130b may comprise set 132, the outputs from 130c may comprise set 133, and the outputs from 130d may comprise set 134. Each of the outputs in each set can be optically connected to a set of output optical waveguides. Output optical waveguide sets are identified in FIG. 2 as sets 135-138.

The substrate 110 can be configured to interface with one or more output fiber ribbons. For example, FIG. 2 shows output fiber ribbons 150w-z each including four output optical fibers connecting to four sets of output optical waveguides 135-138. The output fiber ribbon of FIG. 2 includes fibers that may be aligned relative to one another in a planar relationship. (In other examples, the fibers may be aligned in a non-planar relationship). The input optical waveguides can likewise be aligned and arranged relative to one another in a corresponding planar relationship. For example, the output optical waveguides can be parallel, at least where the output fiber ribbons interface with the substrate. The substrate may include alignment features, such as v-grooves, trenches, hard stops, etc., to precisely align the input and output fiber arrays 120 and 150w-z, respectively, to corresponding waveguides 122 and 135-138. Additionally, the output fiber arrays may be combined into a single fiber ribbon. For example, the four 1×4 fiber arrays may be combined into a single 1×16 fiber array. Coupling optics such as microlens arrays, spot size transformers, lens fibers, and grating couplers may be placed between the input/output fiber ribbon and the waveguides for efficient optical coupling.

The optical bus can include at least one more output optical waveguide than input optical waveguides. For example, in a bus including a single input optical waveguide, a power splitter can split an input optical signal into two optical signals. Each of the two optical signals may be coupled to different output optical waveguides. In some examples, the optical bus can include two times as many output optical waveguides as input optical waveguides, or four times as many output optical waveguides as input optical waveguides, etc. to correspond to the number of outputs from the power splitter(s).

The optical bus 100 can include a waveguide shuffle network 140. The waveguide shuffle network can be formed on the substrate between the power splitter(s) and where the output fibber ribbons interface with the substrate. In one example, the optical bus includes parallel optical waveguides 131-134 and parallel output optical waveguides 135-138 and the waveguide shuffle network comprises at least some non-parallel waveguides between parallel waveguides on either side of the waveguide shuffle network. The waveguide shuffle network can include at least two intersecting optical waveguides which intersect to form a junction 142. The waveguide shuffle network can optically couple at least one of the plurality of outputs from each of the optical power splitters to one set of output optical waveguides and can also optically couple a different one of the outputs from each of the optical power splitters to the different set of output optical waveguides.

The waveguide shuffle network of FIG. 2 optically couples power splitter outputs 131-134 to bus outputs 135-138 while "shuffling" the outputs such that each power splitter output is coupled to a different bus output. In other words, each individual output in set 131 is coupled to a different one of each of output sets 135-138. Output sets 135-138 each receive a portion of the optical signal input into power splitter 130a. In a similar fashion, outputs from power splitters 130b-d are likewise shuffled such that each of output sets 135-138 receive a portion of the optical signals input into power splitters 130b-d. In one aspect, signals transmitted through the waveguides in the shuffle network may be skewed upon reaching an output. However, the skew can be corrected elsewhere in a system network in which the waveguide shuffle network is disposed. In an alternative embodiment, signal skew can be eliminated by equalizing a time delay experienced by a signal in each waveguide prior to the signal(s) reaching a corresponding set of bus output waveguides. Additionally, the waveguides can be tailored to compensate for propagation loss variations through the shuffle network to ensure that the optical power in each of the set of waveguides 135-138 are equal.

As another way of describing the configuration of waveguides on the substrate, first and second sets of output optical waveguides 135, 136 can be formed on the substrate 110. Third or fourth sets 137, 138, or additional sets of waveguides can also be formed on the substrate, but will be omitted from the immediate example for the sake of simplicity. Optical power splitters 130a-b on the substrate can have an input and multiple outputs or sets of outputs 131, 132. The optical power splitters can be optically coupled to an input optical waveguide 105 and can split an input optical beam into multiple output optical beams. The optical bus can include a waveguide shuffle network 140 formed on the substrate. The waveguide shuffle network can include intersecting optical waveguides 142 and can optically couple outputs from each of the optical power splitters to the first set of output optical waveguides 135 and optically couple different outputs from each of the optical power splitters to the second set of output optical waveguides 136. In other words, output set 131 can be optically coupled to output optical waveguide sets 135 and 136, and output set 132 can be also be optically coupled to output optical waveguide sets 135 and 136.

The waveguide shuffle network may be formed from an array of waveguides in a similar fashion to the formation of the input and output optical waveguides. However, the input and output optical waveguides may generally be configured as non-intersecting waveguides while the waveguide shuffle network includes at least one intersection of waveguides. (In some embodiments the input and output optical waveguides may be configured to include intersecting waveguides). A number of intersections of waveguides in the waveguide shuffle network may depend at least in part upon a number and placement of power splitters and output optical waveguides and/or output fiber ribbons. The layout of the waveguides forming the waveguide shuffle network can be configured to minimize a number of intersections. For example, the routing of the waveguides between the power splitters and the output optical waveguides and/or output fiber ribbons can use a direct approach method where a power splitter output closest to an output waveguide will be the output directed to that output waveguide. More specifically, referring to FIG. 2, the bottom or fourth output of power splitter 130a will be directed to output optical waveguide set 138, the next or third output will be directed to output optical waveguide set 137, the second to set 136, and the first to set 135.

As another example of minimizing a number of intersections, the waveguide shuffle network can be configured to include intersections where more than two waveguides intersect. In some instances, maximizing a number of intersecting waveguides at a single intersection can minimize a total number of intersections or the number of times any individual waveguide crosses any other waveguide. For example, FIG. 2 includes a number of two-waveguide intersections, but also includes some three-waveguide intersections and a four-waveguide intersection. The waveguide shuffle network can include any number of intersections comprising any number of intersecting waveguides.

The optical bus can be made without using discrete optical components, such as beam splitters and waveguides, and thus can avoid alignment issues encountered by other systems. The optical bus can be made such that multiple optical elements are integrated on a single chip. The optical bus can be made using a single lithography step and the optical elements can be self-aligned. Also, the optical bus can be manufactured on low-cost substrates, such as glass and silicon, using well-known low-cost, high-volume complementary metal oxide semiconductor (CMOS) manufacturing techniques.

Figure 3:
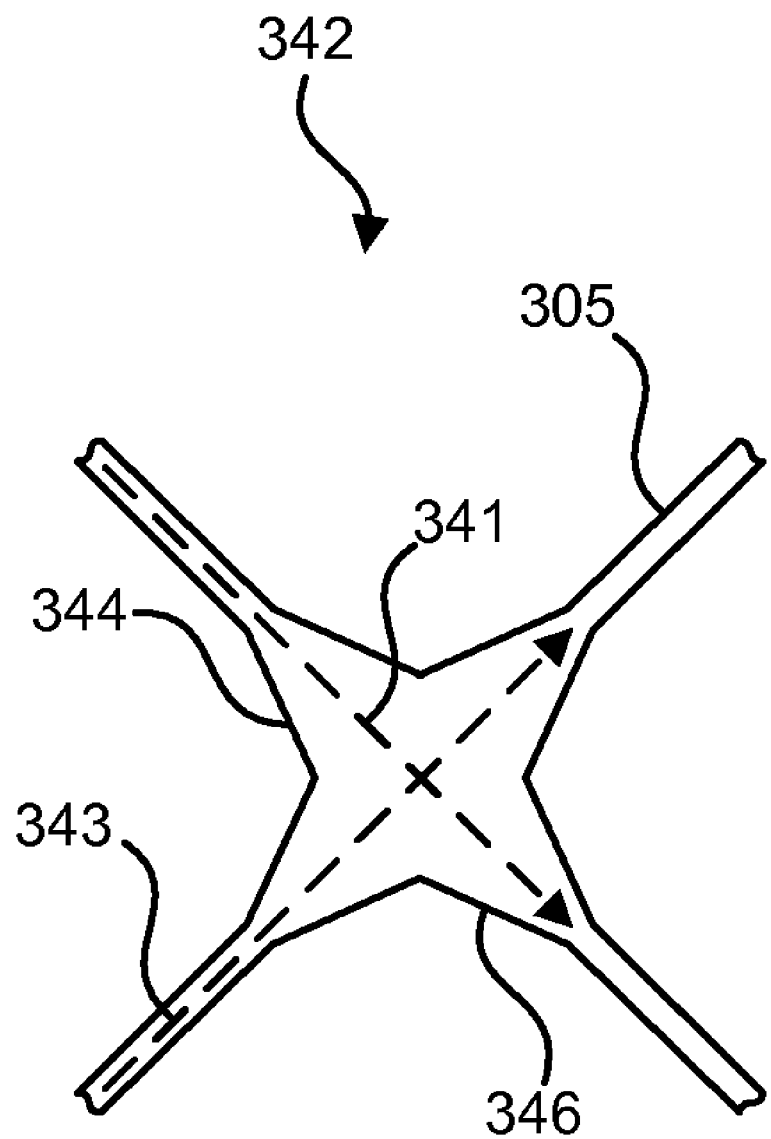
FIG. 3 is a top view of a waveguide intersection in accordance with an embodiment.

Referring to FIG. 3, an intersection or junction 342 of two intersecting waveguides 305 is shown. The intersection of the waveguides can be accomplished without leakage of an optical beam 341, 343 from one waveguide into an unintended waveguide. One or more of the waveguides can be tapered near the junction. The junction shown in FIG. 3 includes an adiabatic taper at both inputs and both outputs of the junction. The waveguides diverge 344 towards the junction and converge 346 away from the junction. Waveguides tapered in this manner can help prevent leakage of an optical signal or optical beam into an unintended waveguide. The length and degree of the taper can vary and may be determined at least in part by a number of intersecting waveguides intersecting at the junction. The tapered waveguides can be formed as solid-core waveguides. Alternatively, the waveguide junction can be designed using the multimode interference effect to image the input waveguide beam to the output waveguide.

Figure 4A:
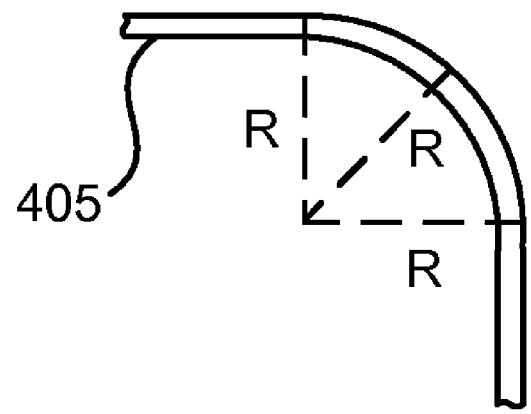
FIGS. 4a-4b are top views of bends in a waveguide comprising a constant radius in accordance with embodiments.
Figure 4B:
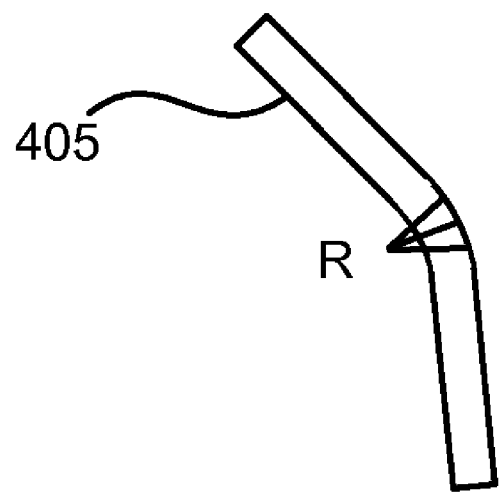

Referring to FIGS. 4a-4b, waveguides 405 comprising a curvature or a bend are shown in accordance with embodiments. While the waveguides shown in FIG. 2 included sharp angles and turns in an optical path formed by the waveguides, FIGS. 4a-4b illustrate an alternate configuration where the waveguides can comprise a curvature instead of a sharp angle or turn. In one aspect, the curvature or bend can have a constant radius R. FIG. 4a illustrates an example configuration where a waveguide bends 90° and includes a constant radius of curvature along the entire 90° bend. FIG. 4b illustrates an example configuration where the waveguide bends less than 90° and maintains a constant radius of curvature along the bend. In other examples not shown, the radius of curvature can be greater or lesser than the radius of curvature in the examples shown. Alternatively, a bend can be designed with a continuously varying radius of curvature which results in the desired angle change between the input and output waveguides of the bend. Also, a change in the angle of the optical path can be achieved using total internal reflection mirrors.

Figure 5A:
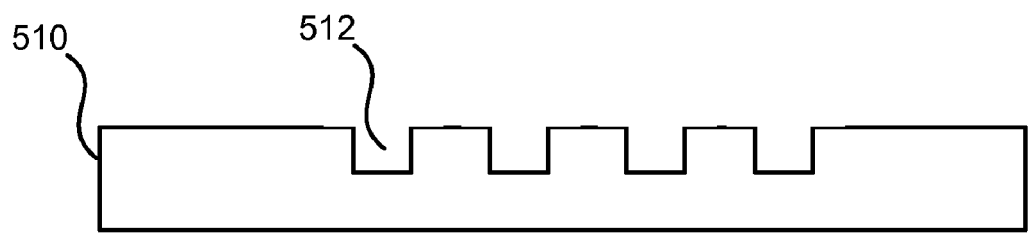
FIGS. 5a-5b are side views of substrates including trenches in accordance with embodiments.
Figure 5B:
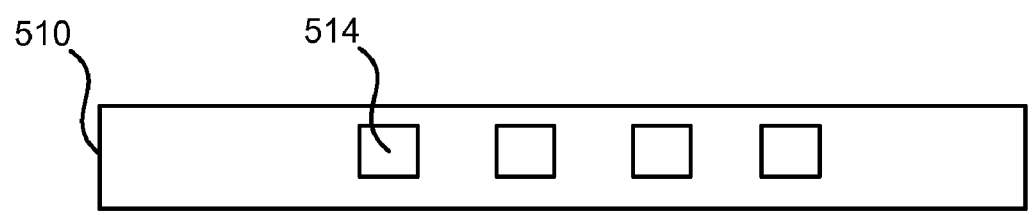

FIGS. 5a-5b illustrate example side views of substrates 510 including trenches 512, 514 according to embodiments. A trench may comprise an area etched into the substrate to align the individual fibers in the fiber ribbon with the waveguides in or on the substrate. For example, the fibers can be fitted into the trenches and be inserted until the fibers contact a solid core waveguide or a hard stop. In this configuration, light can be transmitted from the fiber ribbon into the solid core waveguide. In some examples an index matching gel or material can be inserted between the fiber array and the solid core waveguides to minimize reflections at the fiber solid core waveguide interface. FIG. 5a illustrates an example of trenches which are open on one side and FIG. 5b illustrates an example where the trenches are enclosed within the substrate. The trenches can be coupled to the input optical waveguides and can be configured to receive fibers from the optical fibers such that a signal or optical beam from the optical fibers is communicated to the input optical waveguides. The substrate can include trenches at any or all of the input and output optical waveguides. Because the trenches, along with the waveguides (including the waveguide shuffle network) and power splitters are integrally formed with the substrate, there need be no assembly process for different components of the optical bus after preparation of the substrate. This can reduce time, cost, and complexity in fabrication of optical buses and can eliminate alignment issues which have arisen in previous systems. In embodiments where microlens arrays are utilized for fiber to waveguide coupling, alignment features to attach and align the microlens arrays and fiber arrays to the waveguide for efficient optical coupling may also be included on or in the substrate.

Figure 6:
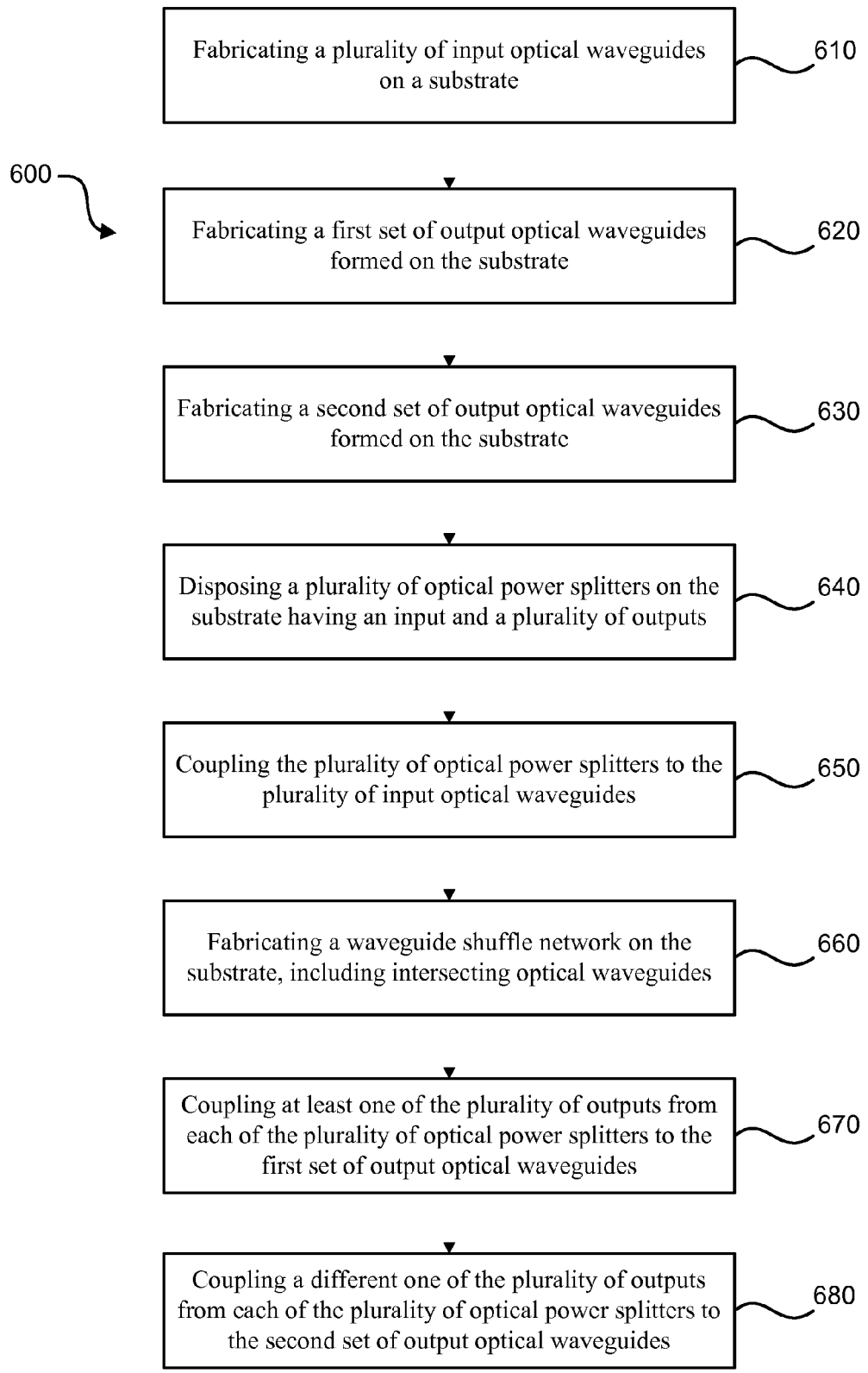
FIG. 6 is a flow diagram of a method for forming an optical bus for broadcasting optical signals in accordance with embodiments.

Referring to FIG. 6, a method 600 is disclosed for forming an optical bus for broadcasting optical signals in accordance with an embodiment. The optical bus can be formed such that a transition medium (e.g., solid-core waveguide) and a power splitter are formed in a single layer lithographically defined on a substrate. The method can include micro-fabricating 610, 620, 630 a plurality of input and output optical waveguides on the substrate. In some examples the substrate may comprises glass. With glass substrates, the method can include doping the glass with phosphorous, titanium, or other impurities to micro-fabricate the optical waveguides. A glass substrate can be etched or make use of impurities diffused into the glass to form the optical waveguides. In one example, the method can include micro-fabricating raised waveguides such as ridge and rib waveguides. In another example, the substrate may comprise a plastic material. In this example, the method can include spin-coating a polymer on a surface of the plastic substrate and lithographically patterning the polymer to form optical waveguides. Alternately, the method can include stamping or injection molding to form polymer waveguides on the plastic or other suitable substrate. In an example where the substrate comprises silicon, the silicon can be etched to form the optical components without the introduction of impurities.

The method 600 can further include disposing 640 a plurality of optical power splitters on the substrate. The power splitters can each have an input and a plurality of outputs. The input of the optical power splitters can be coupled 650 to the plurality of input optical waveguides such that each power splitter is coupled to a different input optical waveguide. A waveguide shuffle network including intersecting optical waveguides can be micro-fabricated 660 on the substrate and can couple 670, 680 the outputs from the optical power splitters to output optical waveguides. In further examples, the method can include integrating spot size transformers on-chip or integrating alignment features for integrating a microlens array onto the substrate. Also, the method can include integrating microlenses, lensed fibers, and/or spot size transformers between the fiber ribbon and input or output waveguides. The optical bus herein can comprise a monolithically integrated chip scale optical bus which can be used in a number of different applications. For example, the optical bus can be used in broadcasting parallel optical signals in computer servers and data centers. The optical bus can be used in blade servers, nanophotonic applications, next generation computing solutions, photonic interconnects, and so forth.

The optical bus can be made without using discrete optical components and thus can avoid assembly and alignment issues encountered by other systems. The optical bus can be made such that multiple optical elements are integrated on a single chip. The optical bus can be made using a single lithography step and the optical elements can be self-aligned. Also, the optical bus can be manufactured on low-cost substrates using well-known low-cost, high-volume manufacturing techniques.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

The invention claimed is:

1. An optical bus for broadcasting optical signals, comprising:
   a substrate;
   a plurality of input optical waveguides formed on the substrate;
   a first set of output optical waveguides formed on the substrate;
   a second set of output optical waveguides formed on the substrate;
   a plurality of optical power splitters on the substrate having an input and a plurality of outputs, individual of the optical power splitters being optically coupled to at least one of the plurality of input optical waveguides and configured to split an input optical beam into a plurality of output optical beams; and
   a waveguide shuffle network formed on the substrate comprising intersecting optical waveguides, wherein the waveguide shuffle network optically couples at least one of the plurality of outputs from individual of the optical power splitters to the first set of output optical waveguides, and wherein the waveguide shuffle network optically couples a different one of the plurality of outputs from individual of the plurality of optical power splitters to the second set of output optical waveguides.

2. An optical bus as in claim 1, further comprising a plurality of trenches etched into a surface or formed on the substrate for at least one of the plurality of input optical waveguides, the first set of output optical waveguides, and the second set of output optical waveguides, the trench being operable to align at least one fiber from a fiber ribbon with the at least one of the plurality of input optical waveguides, the first set of output optical waveguides, and the second set of output optical waveguides.

3. An optical bus as in claim 2, further comprising a trench for all of the plurality of input optical waveguides, the first set of output optical waveguides, and the second set of output optical waveguides.

4. An optical bus as in claim 1, wherein the intersecting optical waveguides intersect at a junction, and the intersecting optical waveguides comprise an adiabatic taper near the junction.

5. An optical bus as in claim 4, wherein the
   junction comprises a multimode interference based junction.

6. An optical bus as in claim 1, wherein the plurality of input optical waveguides comprise parallel input optical waveguides.

7. An optical bus as in claim 1, wherein waveguides in the first and second sets of output optical waveguides comprise parallel output optical waveguides.

8. An optical bus as in claim 1, wherein the input optical waveguides, the first set of output optical waveguides, and the second set of output optical waveguides comprise solid core waveguides.

9. An optical bus as in claim 1, wherein the shuffle network is structured such that the first and second sets of output optical waveguides are optically coupled to the plurality of optical power splitters to each receive part of an input optical beam from each waveguide in the plurality of input optical waveguides.

10. An optical bus as in claim 1, wherein the plurality of input optical waveguides, the first set of output optical waveguides, and the second set of output optical waveguides are etched into the substrate or formed on the surface of the substrate.

11. An optical bus as in claim 1, wherein the substrate comprises silicon, silicon on insulator, glass or silica.

12. An optical bus as in claim 1, wherein the substrate comprises a plastic and waveguides in the plurality of input optical waveguides, the power splitters, waveguide shuffle network, the first set of output optical waveguides, and the second set of output optical waveguides comprise a polymer.

13. An optical bus as in claim 1, wherein at least one waveguide comprises a bend having a constant radius or an adiabatic continuously varying radius.

14. A method for forming an optical bus for broadcasting optical signals, comprising:
   fabricating a plurality of input optical waveguides on a substrate;
   fabricating a first set of output optical waveguides formed on the substrate;
   fabricating a second set of output optical waveguides formed on the substrate;
   disposing a plurality of optical power splitters on the substrate having an input and a plurality of outputs;
   coupling the plurality of optical power splitters to the plurality of input optical waveguides;
   fabricating a waveguide shuffle network on the substrate, including intersecting optical waveguides;
   coupling at least one of the plurality of outputs from each of the plurality of optical power splitters to the first set of output optical waveguides; and
   coupling a different one of the plurality of outputs from each of the plurality of optical power splitters to the second set of output optical waveguides.

15. A method as in claim 14, further comprising laying out the waveguide shuffle network to minimize a number of intersecting optical waveguides.

16. A method as in claim 14, further comprising forming an adiabatic taper in the waveguide shuffle network near a junction where the intersecting optical waveguides intersect.

17. A method as in claim 14, further comprising forming the substrate from glass and doping the glass with phosphorous or titanium to fabricate the plurality of input optical waveguides, the power splitters, the waveguide shuffle network, the first set of output optical waveguides, and the second set of output optical waveguides.

18. A method as in claim 14, wherein microfabricating the plurality of input optical waveguides, the power splitters, the waveguide shuffle network, the first set of output optical waveguides, and the second set of output optical waveguides further comprises fabricating raised waveguides.

19. A method as in claim 14, wherein the substrate comprises plastic or glass and the method further comprises spin-coating a polymer on a surface of the substrate and lithographically patterning the polymer to form the plurality of input optical waveguides, the power splitters, the shuffle network, the first set of output optical waveguides, and the second set of output optical waveguides.

20. An optical bus for broadcasting optical signals, comprising:
   a substrate;
   an input optical waveguide formed on the substrate;
   a first output optical waveguide formed on the substrate;
   a second output optical waveguide formed on the substrate;
   an optical power splitter on the substrate having an input and a plurality of outputs, the optical power splitter being optically coupled to the input optical waveguide and configured to split an input optical beam into a plurality of output optical beams directed to the first and second output optical waveguides; and
   a trench etched into a surface of the substrate for at least one of the input optical waveguide, the first output optical waveguide, and the second output optical waveguide, the trench being operable to align fibers from a fiber ribbon with the at least one of the input optical waveguide, the first output optical waveguide, and the second output optical waveguide.

* * * * *